(12) United States Patent
Gleitman et al.

(10) Patent No.: US 10,378,318 B2
(45) Date of Patent: Aug. 13, 2019

(54) MONITORING HYDROCARBON RECOVERY OPERATIONS USING WEARABLE COMPUTER MACHINES

(71) Applicant: HALLIBURTON ENERGY SERVICES, INC., Houston, TX (US)

(72) Inventors: Daniel David Gleitman, Houston, TX (US); Saad Saeed, Houston, TX (US); Kristy Bell, Houston, TX (US); Florin Anghelescu, Houston, TX (US); David Crawshay, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/309,720

(22) PCT Filed: Jun. 13, 2014

(86) PCT No.: PCT/US2014/042270
§ 371 (c)(1),
(2) Date: Nov. 8, 2016

(87) PCT Pub. No.: WO2015/191079
PCT Pub. Date: Dec. 17, 2015

(65) Prior Publication Data
US 2017/0152729 A1   Jun. 1, 2017

(51) Int. Cl.
*G02B 27/01* (2006.01)
*E21B 41/00* (2006.01)
(Continued)

(52) U.S. Cl.
CPC .......... *E21B 41/0092* (2013.01); *E21B 41/00* (2013.01); *E21B 44/00* (2013.01);
(Continued)

(58) Field of Classification Search
None
See application file for complete search history.

(56) References Cited

U.S. PATENT DOCUMENTS

2007/0121423 A1* 5/2007 Rioux ............ G01V 1/16
367/69
2012/0299870 A1   11/2012 Chi et al.
(Continued)

FOREIGN PATENT DOCUMENTS

| EP | 2679326 A1 | 1/2014 |
| WO | 2014062174 A1 | 4/2014 |
| WO | 2015191079 A1 | 12/2015 |

*Primary Examiner* — Muhammad N Edun
*Assistant Examiner* — Jerold B Murphy
(74) *Attorney, Agent, or Firm* — Tenley Krueger; Parker Justiss, P.C.

(57) ABSTRACT

The subject matter of this specification can be embodied in, among other things, a wearable computer device positionable on a human body. The wearable computer device is configured to receive sensor information from a collection of sensors that includes a first sensor and a second sensor, the first sensor attached to the human wearable device and the second sensor connected to the human wearable device, the sensor information describing operational attributes of the oil and gas drilling or production operations that either implements a hydrocarbon recovery process or a hydrocarbon recovery machine at a time of obtaining the sensor information, identify baseline sensor information describing operational attributes during normal operation of either the hydrocarbon recovery process or the hydrocarbon recovery machine, compare the sensor information and the baseline sensor information, and provide a notification indicating an operational condition of the oil and gas drilling or production operation.

26 Claims, 9 Drawing Sheets

(51) Int. Cl.
*E21B 44/00* (2006.01)
*E21B 47/00* (2012.01)
*G06T 11/60* (2006.01)
G06F 3/16 (2006.01)

(52) U.S. Cl.
CPC .......... *E21B 47/00* (2013.01); *G02B 27/0172* (2013.01); *G06T 11/60* (2013.01); *G02B 2027/014* (2013.01); *G06F 3/167* (2013.01)

(56) References Cited

U.S. PATENT DOCUMENTS

| | | |
|---|---|---|
| 2013/0044042 A1 | 2/2013 | Olsson et al. |
| 2013/0186687 A1 | 7/2013 | Snyder et al. |
| 2014/0168266 A1* | 6/2014 | Kimura .............. G02B 27/0172 345/633 |
| 2015/0170504 A1* | 6/2015 | Jooste .................. A61B 5/6898 340/539.12 |
| 2015/0244903 A1* | 8/2015 | Adams ................ G02B 27/017 348/376 |
| 2015/0339948 A1* | 11/2015 | Wood ...................... G06N 5/02 434/219 |

* cited by examiner

MONITORING HYDROCARBON RECOVERY OPERATIONS USING WEARABLE COMPUTER MACHINES

CROSS-REFERENCE TO RELATED APPLICATION

This application is the National Stage of, and therefore claims the benefit of, International Application No. PCT/US2014/042270 filed on Jun. 13, 2014, entitled "MONITORING HYDROCARBON RECOVERY OPERATIONS USING WEARABLE COMPUTER MACHINES," which was published in English under International Publication Number WO 2015/191079 on Dec. 17, 2015. The above application is commonly assigned with this National Stage application and is incorporated herein by reference in its entirety.

TECHNICAL FIELD

This instant specification relates to applications of wearable computers to hydrocarbon recovery operations.

BACKGROUND

The exploration and preparation of hydrocarbon recovery sites, as well as the setup, operation, and maintenance of hydrocarbon recovery machines, produces and consumes large amounts of information. The process of producing and consuming hydrocarbon recovery data is also often performed by operators working in remote locations while engaging in physically challenging situations.

In connection with the recovery of hydrocarbons from the earth, wellbores are generally drilled using a variety of different methods and equipment. According to one common method, a drill bit is rotated against the subsurface formation to form the wellbore. The drill bit is rotated in the wellbore through the rotation of a drill string attached to the drill bit and/or by the rotary force imparted to the drill bit by a subsurface drilling motor powered by the flow of drilling fluid down the drill string and through downhole motor. Such processes are monitored by operators to produce data that describes drill bit speed, drill string vibration, drilling fluid pressure, and other information that describes the hydrocarbon recovery process and/or site. Such rotation from surface may be powered by a rotary table or top drive system. Such fluid flow may be powered by one or more pumps, and fluid mixing and management may be performed using various mixers and materials handling machines. Such drilling may be accompanied by rotating a cable spool to raise or lower a block, advancing or pulling up the drill string in the hole. These various machines and devices may be hydraulically, pneumatically, or electrically powered, and the well site may include one or more generators for such power. Logging, casing, and/or cementing processes may take place in relation to the well, utilizing various spooling devices, pumps, and other machines at surface. Coiled tubing may be run into and out of the well, utilizing a coiled tubing injector machine. High pressure fluid may be pumped into the well, e.g. for cementing or fracturing the formation, using high pressure pumps and other machines. Fluid including hydrocarbon may be produced from the subsurface and may be handled or processed at surface, in some cases using pumps and/or compressors. Such processes are monitored by operators to produce data that describes for example drill string and/or bit speed, drill string and/or bit torque, drill string vibration, drilling fluid flow and pressure, pump or compressor speed, pressure, and flow rate, and other information that describes the hydrocarbon recovery process and/or site.

DETAILED DESCRIPTION

Figure 1:
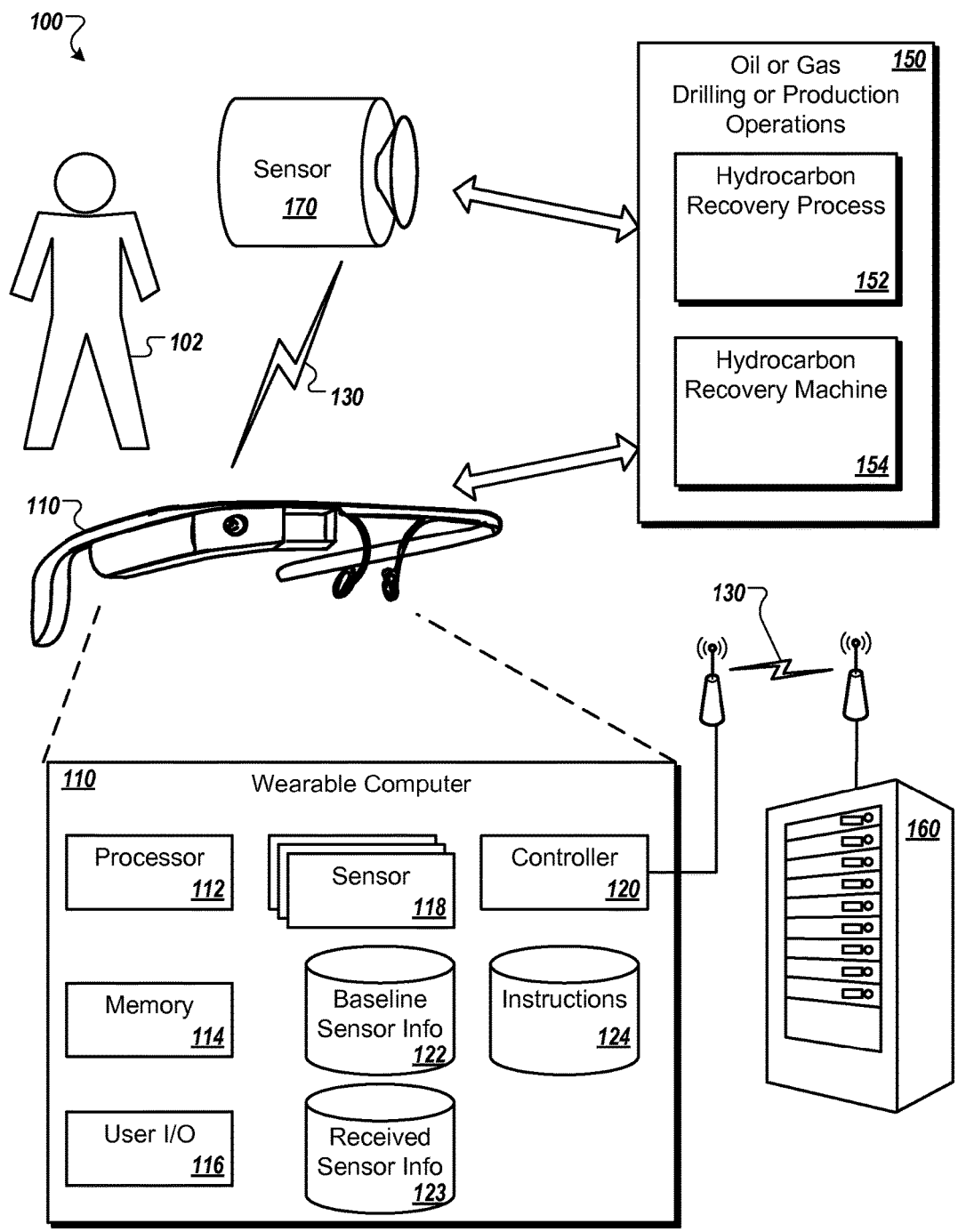
FIG. 1 is a block diagram that shows an example of a system for using a wearable computer device in gas and oil drilling or production operations.

This document describes systems and techniques for using wearable computer devices in gas and oil-related operations (e.g., surveying, drilling, tripping pipe, mixing and pumping mud or other fluids, running wireline logging tools or slickline tools, running casing, pumping cement, perforating, pressure pumping including for fracturing, production and managing produced fluids, running coiled tubing, running intervention tools, plugging, or other operations). In general, wearable computers include multiple sensors (e.g., one or more of cameras, microphones, user input devices, accelerometers, and other sensors) that can collect and process information that describes hydrocarbon recovery processes (e.g., scouting well locations, site surveying, or other processes) and/or hydrocarbon recovery machines (e.g., pumps, motors, drill strings, or other hydrocarbon recovery equipment). Wearable computers generally include features that provide communications with external computers and peripherals, and in the examples described in this document, such communication features are used to communicate with servers and external sensors in order to collect, analyze, and report data collected from gas and oil drilling or production operations. Wearable computers may also include contextual or locating capabilities such as GPS, WiFi, Bluetooth, RFID, infrared beacons, or any other appropriate form of location or context enabled sensor.

In some implementations, the hydrocarbon recovery processes noted above can include activities and/or hydrocarbon recovery equipment located on or proximate to a land drilling rig, a land production facility including one or more wellheads, an offshore drilling or production platform, a drill ship, an FPSO, or other location of hydrocarbon production, collectively described herein as "hydrocarbon production facilities". Many of these activities and/or equipment may control, or be coordinated with, equipment and/or activities within a subterranean well. In some examples, these activities and/or equipment may be transient. For example service providers (e.g., personnel and equipment, frac pumps and associated equipment and personnel) may arrive at the hydrocarbon production facility, rig up their equipment, operate or allow operation of their equipment, and then rig down and depart. In some examples, equipment may be more permanently established at the hydrocarbon production facility, but may require adjustment of location (e.g., a drilling rig) in the course of operations. In some examples, equipment may have faults or failures, requiring it to be changed out, or may require on-location repairs or maintenance. The equipment may include various integral or associated sensors for condition monitoring, and for monitoring the particular hydrocarbon recovery processes involving the equipment. In some implementations, the environment described above can be dynamic and/or changing, and there may be conditions and/or process parameters that the integral or associated sensors are configured to detect.

In a very general example, a user at a hydrocarbon production facility wears a wearable computer while performing a gas and oil-related operation. By using a wearable computer, rather than a laptop or tablet computer, the user's hands remain free to use for other purposes. The wearable computer communicates with external sensors or equipment which may also be worn to help the user perform the operation. For example, the user can direct a thermal imaging camera at a piece of operational equipment to obtain a thermal image, and the camera can transfer the image to the wearable computer for processing. The user may direct the wearable computer to transmit the image and/or other data to a remote computer for storage, further processing, and/or analysis by remote personnel. The information collected by the wearable computer from onboard and/or external sensors may be compared to baseline information, and a notification can be provided based on the comparison. For example, the thermal image that was discussed previously may be compared against an expected thermal profile to determine if the scanned equipment is running hot, and if so the user may be given an alert through the wearable computer, or a notification may be sent to remote personnel to alert them to the detected hot condition.

FIG. 1 is a block diagram that shows an example of a system 100 for using a wearable computer device 110 in a gas and oil environment 150, such as gas and oil drilling or production environment. The environment 150 includes a hydrocarbon recovery process 152 and a hydrocarbon recovery machine 154. In some implementations, the hydrocarbon recovery machine 154 can be any appropriate machine or equipment used for gas or oil operations or production. For example, the hydrocarbon recovery machine 154 can be a drill string, a pump, a motor, a drilling platform, a supply or recovery tank, or any other appropriate machine or component of a machine for recovering gas or oil. The hydrocarbon recovery machine 154 may include rotary elements and/or reciprocating elements, such as rotary tables, top drive systems, pumps, compressors, mixers, material handling machines, cable spools, blocks, drill strings, generators, coiled tubes, coiled tubing injector machines, or any other appropriate rotating or reciprocating element that can be sensed by a sensor. In some implementations, the hydrocarbon recovery process 152 can be any appropriate process and/or tool used in a gas or oil production operation. For example, the hydrocarbon recovery process 152 can be a site survey, seismic survey, system or equipment maintenance process, safety operation process, site management process, logistics process, transportation process, storage process, a frac'ing process, a cementing process, or any other appropriate process or task for recovering gas or oil.

The wearable computer device 110 is worn on the body of a user 102. In the illustrated example, the wearable computer device 110 is configured as a head mounted device (HMD), but in other embodiments the wearable computer device 110 can be worn on a belt, on a wrist, on a forearm, around the neck, or otherwise worn or carried by the user 102. In some implementations, by wearing the wearable computer device 110 on the body of the user 102, the hands of the user 102 are left free to perform other operations. For example, use of an HMD with speech input allows the user 102 to work with his/her hands to perform a hydrocarbon recovery task while also operating a camera built into the HMD and accessing the functions of the HMD (e.g., though voice commands, head motion, gestures, eye motion, or other inputs) without taking his/her hands away from the hydrocarbon recovery task. In some implementations, use of an HMD may allow the user 102 to direct sensing functions toward or upon a selected machine or operation at the hydrocarbon production facility, or toward or upon a selected part of the machine or operation.

The wearable computer device 110 includes a processor 112, a memory 114, and user inputs and outputs 116. In some embodiments, the user inputs and outputs 116 can include inputs such as buttons, touch sensors, gesture sensors, eye gaze detectors, blink detectors, proximity sensors, and any other appropriate device with which the user 102 can interact to provide input to the wearable computer 110. In some embodiments, the user inputs and outputs 116 can include outputs such as visual displays, lights, speakers or other audio transducers, vibrators, haptic feedback, and any other appropriate device that can be used to provide feedback to the user 102.

The wearable computer device 110 also includes a collection of sensors 118. In some embodiments, the sensors 118 can include microphones, cameras, accelerometers, global positioning system (GPS) receivers, magnetic sensors (e.g., compass), gravitational sensors (e.g., inclinometer), temperature sensors, pressure sensors (e.g., barometer), proximity sensors, and any other appropriate device that can be used to sense and provide information to the processor 112 about the environment of the wearable computer device 110.

The wearable computer device 110 also includes a controller 120. The controller 120 provides wired (e.g., Ethernet, USB) or a wireless (e.g., Bluetooth, wireless Ethernet, near field communications) communication link 130 with external computers and devices, such as a server 160 and an external sensor 170. In some embodiments, the external sensor 170 can be one or more microphones, cameras, thermal imagers, accelerometers, global positioning system (GPS) receivers, magnetic sensors (e.g., compass), gravitational sensors (e.g., inclinometer), temperature sensors, pressure sensors (e.g., barometer), proximity sensors, vibration sensors, gas detectors, radiation detectors, flame detectors, and any other appropriate device that can be used to sense and provide information to the wearable computer device 110 about the gas and oil environment 150. For example, the controller 120 can provide a Bluetooth connection between the wearable computer device 110 and a handheld thermal imaging camera, vibration sensor, or engine control unit communications (e.g., OBDII) adapter.

The wearable computer device 110 stores or has access to a collection of baseline sensor information 122, computer instructions 124, and received sensor information 126. The baseline sensor information 122 is a collection of information that may describe a predetermined (e.g., anticipated) condition of a signal provided by a sensor, such as the sensors 118 or the external sensor 170. In some implementations, baseline sensor information 122 may describe historical condition of a signal provided by a sensor, or may describe a calculated, or manufacturer specified condition of a signal provided by said sensor. In some implementations, the baseline sensor information 122 may describe the amplitude, frequency, spectral properties, waveform, thresholds, statistical properties, or combinations of these and any other predetermined characteristic of a sensed signal that represents properties of the hydrocarbon recovery process 152 or the hydrocarbon recovery machine 154 at a predetermined expected or nominal state. For example, the baseline sensor information 122 can represent an example waveform of a sensor configured to sense the vibration of a motor under expected nominal operating conditions.

In some implementations, the baseline sensor information 122 may describe predetermined, rated, or predicted characteristics of signals or information derived from signals provided by the sensors 118 or the external sensor 170. For example, the baseline sensor information can describe an average, mean, or other value that describes the characteristics of a sensed output under previously observed conditions. In another example, the baseline sensor information can describe a value that describes the rated performance characteristics of a sensed output under a given set of input conditions. In yet another example, the baseline sensor information can describe a value that describes an anticipated characteristic of a sensed output under a given set of input conditions.

The computer instructions 124 provide instructions that, when executed by the processor 112, perform one or more of the processes for using a wearable computer device 110 in a gas and oil environment 150. In general, the computer instructions 124 cause the wearable computer device 110 to collect information from the sensors 118 and/or 170 and compare the collected information to the baseline sensor information 112. In some implementations, the computer instructions 124 can cause the wearable computer device 110 to provide a notification. For example, the wearable computer device 110 can provide a visual display, an audible alert, a haptic feedback or other notification to notify the user 102 of whether the collected sensor information indicates that the hydrocarbon recovery process 152 or the hydrocarbon recovery machine 154 is operating within or beyond predetermined operational limits.

The received sensor information 123 is a collection of information received as a signal provided by a sensor, such as the sensors 118 or the external sensor 170. In some implementations, the received sensor information 123 may describe the amplitude, frequency, spectral properties, waveform, thresholds, statistical properties, or combinations of these and any other characteristic of a sensed signal that represents properties of the hydrocarbon recovery process 152 or the hydrocarbon recovery machine 154 at a predetermined expected or nominal state. For example, the received sensor information 123 can represent an example measurement or waveform provided by a sensor configured to sense the temperature of a fluid pipe under expected nominal operating conditions.

In some implementations, some or all of the computer instructions 124 can be performed by or at the server 160 or other computer, For example, the wearable computer device 110 can collect information from the sensors 118 and/or 170, and provide the collected information to the server 170 over the link 130. The server 160 can compare the collected information to the baseline sensor information 122. The server 160 can provide a notification that describes the comparison to the wearable computer device 110 for presentation to the user 102, and/or provide a notification at another output. For example, the server 160 can provide a visual notification (e.g., a pop-up dialog box) on a terminal screen, send an email, text, or instant message (IM) to operations personnel alerting them of a problem detected by the comparison.

In some implementations, the output to the user 102 can be an image from another sensor which overlays the actual viewed item, or which overlays a visual image of the viewed item, or overlays a drawing or other representation of the item. For example, a thermal image of a pump assembly may show blue for many components of the assembly to indicate that the components have relatively cool temperatures, and may show other, relatively warmer components in red, such as when a particular valve body in which a worn valve is experiencing excessive amounts of friction. In some implementations, the user 102 can direct his gaze along a pump, and an auditory sensor (e.g., a focused microphone having a parabolic focus element) can be directed along the pump. An auditory spectrum can be captured in real time to correspond to the particular imaged location along the pump, and information obtained from the spectrum can be presented to the user 102, for example as a spectrum chart or a colored image of the pump in which colors corresponding to spectral parameters (e.g., rather than thermal) can be displayed to indicate various operational states of the pump. In some implementations, sensor output graphs, images, spectra, heat maps, or any other appropriate representations of machine characteristics or health can be stored. In some implementations, stored representations can be retrieved and redisplayed at a later time. In some implementations, representations may be presented in combination, juxtaposition, or comparison to a current image or a stored image. For example, the wearable computer device 110 can provide a progressive viewing of condition over time, or a "before/after" comparison (e.g. before and after repair). In some implementations, sensor data from multiple sensors may be combined. For example, a thermal image and auditory data (e.g., sound image) may be used in combination to provide information regarding condition of the item being observed. In some embodiments the wearable computer system 110 may be configured to detect and/or analyze the interaction of dynamic components of machines based on distinct auditory outputs produced by friction, lubrication, speed, impact, and other factors that may relate to the machine performance and condition, and upon the fact that heat generation is often a direct, correlating result.

Figure 2A:
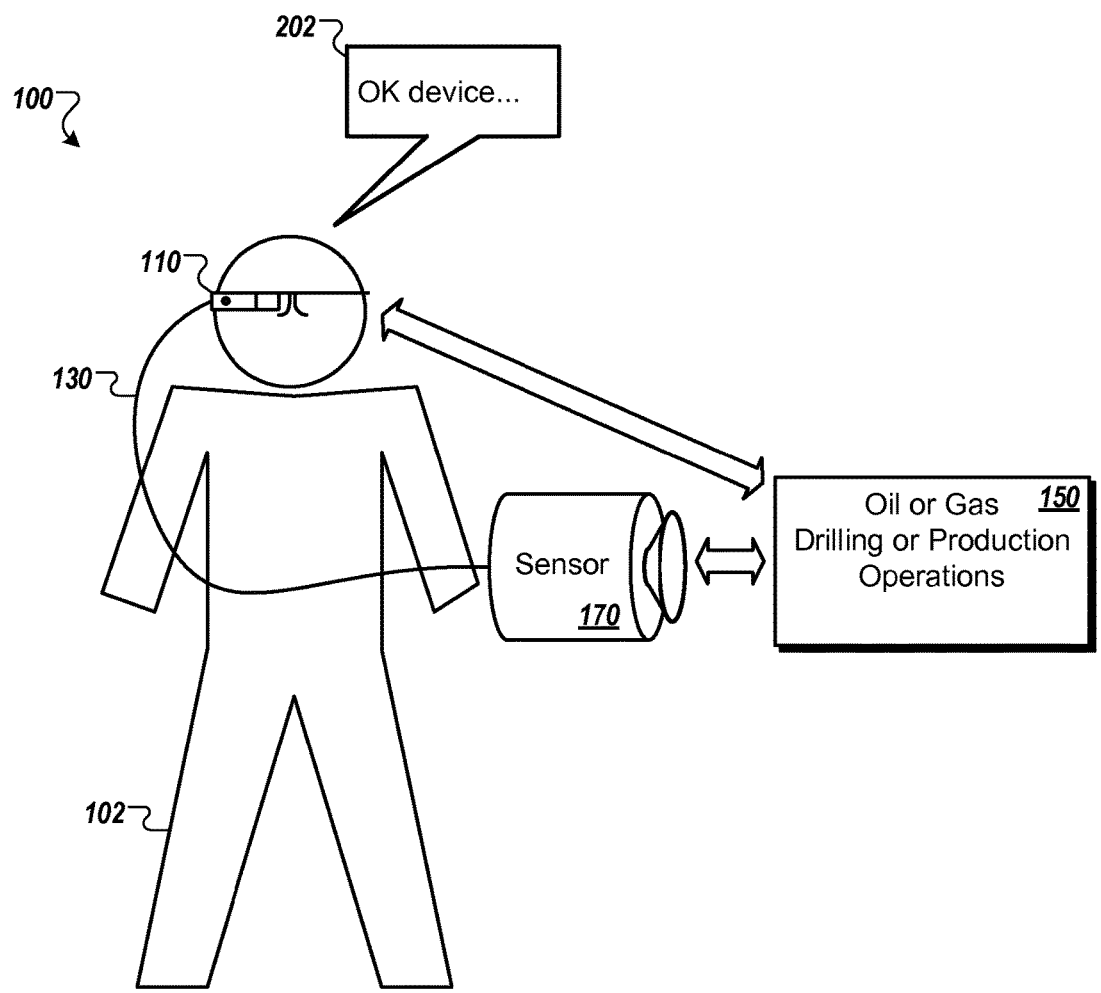
FIGS. 2A-2B are conceptual diagrams of example interactions of a user and the system of FIG. 1.
Figure 2B:
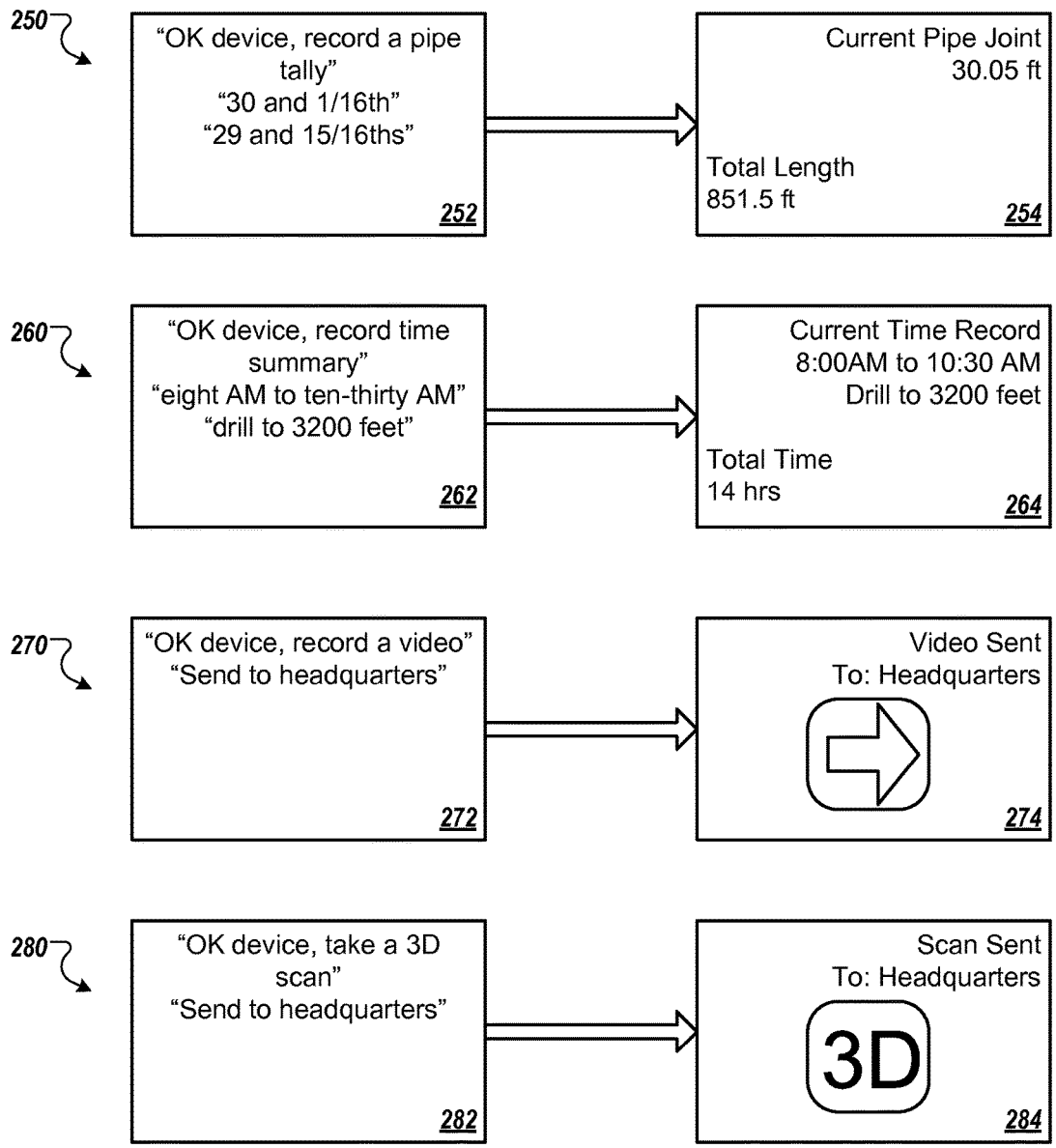

FIGS. 2A-2B are conceptual diagrams of an example of interactions between the user 102 and the system 100 of FIG. 1. Referring to FIG. 2A, the user 102 wears the wearable computer device 110 (e.g., on the head, strapped to an arm, worn on a belt), and manipulates the external sensor 170 to collect sensor information that describes properties of the gas and oil environment 150. For example, the user 102 can direct a camera built into the wearable computer device 110 to capture images of the gas and oil environment 150. In another example, the user 102 can aim a laser rangefinder to determine a target associated with of the gas and oil environment 150, which may be the hydrocarbon recovery process 152 or the hydrocarbon recovery machine 154. In some implementations, the user 102 can provide an input to the wearable computer device 110 to connect to the external sensor 170 and/or to request data from the external sensor 170. For example, the user 102 can issue a voice command such as "OK device, take a thermal scan," to connect to a thermal imager and/or to cause the thermal imager to take a thermal scan as the user 102 focuses his/her view, and correspondingly that of a thermal imaging sensor device, upon the target, and transfer the captured image to the wearable computer device 110.

The user 102 provides an input or otherwise triggers the wearable computer device 110 to perform an action based in part on information provided by the sensors 118 and/or 170.

For example, the user 102 can press a button, provide a gesture, touch a touchpad, provide an audible command, or any other appropriate action that can trigger an operation of the wearable computer device 110. In the illustrated example, the user 102 speaks a trigger phrase 202 (e.g., "Ok device" or other trigger phrase) to request the wearable computer device 110 to perform an action, such as collecting information from the sensors 118 and/or 170, and compare the collected information to the baseline sensor information 122. In some implementations, the wearable computer system 110 can overlay non-visual data (e.g., thermal image or acoustical image) upon a visual image. For example, two or more identifiable features or other features that are associated with the target and are known to align or correspond on both the visual and the non-visual data sets can be used to help the system in overlaying the two data sets to produce a resulting composite image. In some implementations, machine vision processes may be used to identify known objects and/or landmarks and retrieve known geographic locations of those objects and/or landmarks with greater precision than can be obtained from other location-detection systems such as GPS.

Referring now to FIG. 2B, several example interactions between the user 102 and the system 100 of FIG. 1 are illustrated. In an example interaction 250, the user 102 speaks a command 252 "OK device, record a pipe tally", followed by the phrases "30 and $\frac{1}{16}$th" and "29 and $\frac{15}{16}$ths" to represent lengths of drill or fluid pipe. In the illustrated examples, the sensor collected information is the user's voice commands as detected by a microphone included among the sensors 118 and processed by the processor 112 (e.g., speech to text recognition). In response, the wearable computer device 110 provides a notification 254 that informs the user of information resulting from a comparison or calculation based on the collected information.

In an example interaction 260, the user 102 speaks a command 262 "OK device, record time summary", followed by the phrases "eight AM to ten-thirty AM" and "drill to 3200 feet" to represent a time log entry. In response, the wearable computer device 110 provides a notification 264 that informs the user of information resulting from a comparison or calculation based on the collected information.

In an example interaction 270, the user 102 speaks a command 272 "OK device, record a video. In response, the wearable computer device 110 accesses a camera in the form of one of the sensors 118 or the external sensor 170 to record a digital video that is stored in or accessible by the wearable computer device 110. The user then speaks the phrase "send to headquarters" to request that the recorded video be transmitted to the server 160 (e.g., for remote analysis by engineers or other operations personnel). In response, the wearable computer device 110 provides a notification 274 that informs the user that the video was sent as requested.

In another example interaction 280, the user 102 speaks a command 282 "OK device, take a 3D scan. In response, the wearable computer device 110 accesses a three-dimensional scanner in the form of the external sensor 170 to record a three-dimensional scan of an object or area and transfer the scan data to the wearable computer device 110. The user then speaks the phrase "send to headquarters" to request that the scan data be transmitted to the server 160 (e.g., for remote 3D analysis, for remote 3D printing). In response, the wearable computer device 110 provides a notification 284 that informs the user that the scan data was sent as requested.

Figure 3:
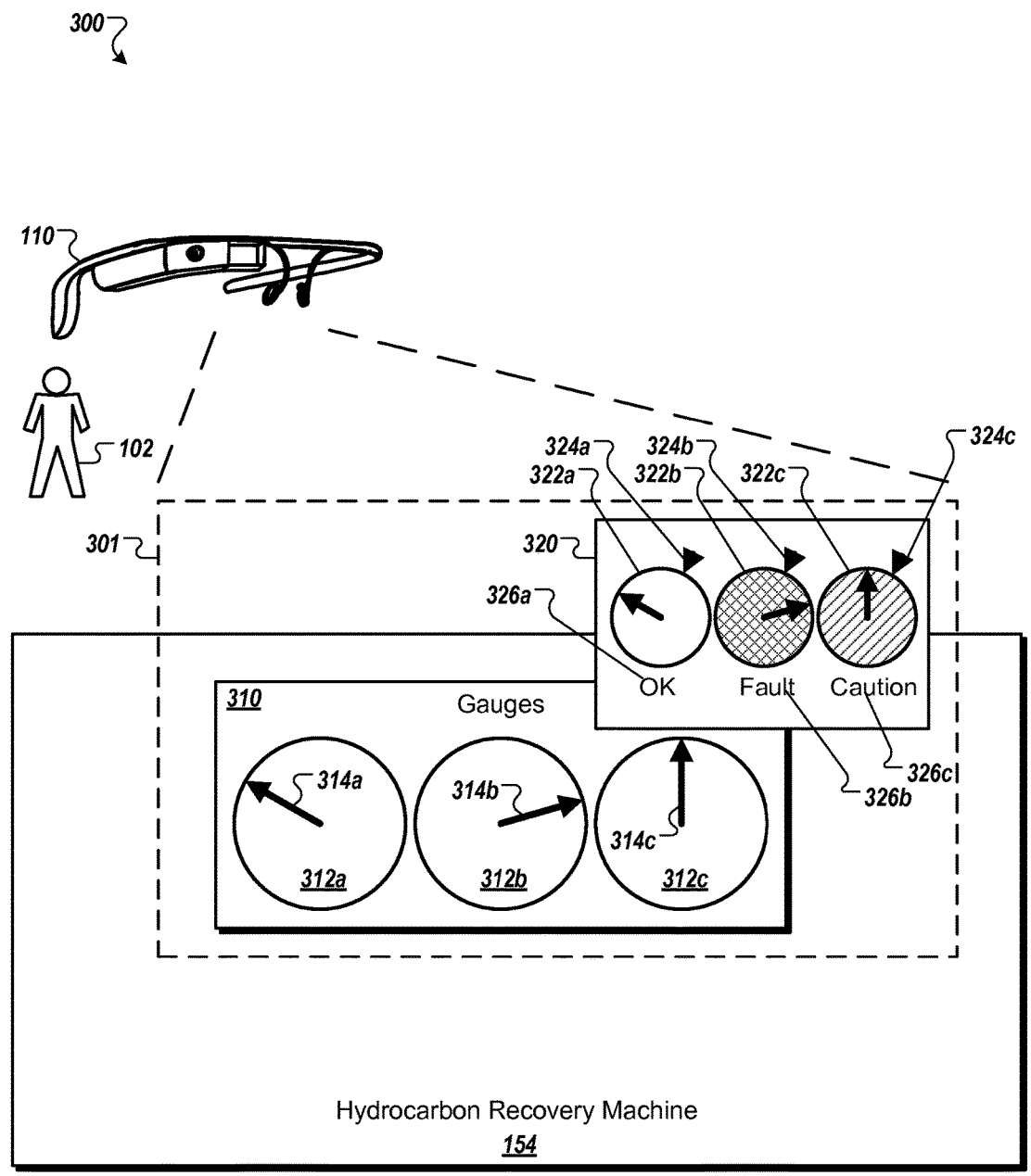
FIG. 3-6 show conceptual examples of applications of the wearable computer device of FIG. 1 in an example gas and oil drilling or production operation.

FIG. 3 shows a conceptual example 300 of an application of the wearable computer device of FIG. 1 in an example gas and oil drilling or production operation. In the illustrated example, the user directs a field of view 301 of the wearable computer device 110 to include a view of a gauge cluster 310 which displays properties of the hydrocarbon recovery machine 154. The user directs the wearable computer device 110 to capture an image (e.g., using the sensors 118 and/or the external sensor 170) of the gauge cluster 310. The gauge cluster 310 includes a collection of gauges 312a-312c. In some implementations, the collection of gauges 312a-312c can include an identifier, such as a boilerplate emblazoned with part numbers, barcodes, or other appropriate identifiers that can be processed using optical character recognition (OCR) or other machine vision techniques. For example, the user 102 can direct his/her field of view to an identifier associated with the equipment to obtain a part number, identifier, and/or serial number, which can be used to correlate with database of expected or nominal, values, allowed ranges, and/or historical values. In some examples, GPS or other locating capability (e.g. WiFi based and other real time locating systems such as those available from Ekahau, Inc.) can be used to establish maps of equipment within locations such as a hydrocarbon recovery facility, and later the user can provide inputs to the system to identify the equipment and correlate subsequent sensor inputs over time for a selected piece of equipment. The map can be updated over time as equipment moves in, out, and about the location.

The wearable computer device 110 processes the image, for example by using pattern machine or other machine vision techniques, to sense and determine the positions of a needle 314a, a needle 314b, and a needle 314c. The sensed positions of the needles 314a-314c are compared to baseline needle positions. For example, the wearable computer device 110 or the server 160 can compare the sensed needle positions against predetermined position thresholds or ranges expected for the needles 314a-314c under nominal operating conditions. In some implementations, the predetermined position thresholds or ranges can be stored by the wearable computer device 110. In some implementations, the predetermined position thresholds or ranges can be stored by the server 160. In some implementations, the wearable computer device 110 can download the predetermined position thresholds or ranges from the server 160.

The wearable computer device 110 provides a notification 320 in the form of a display visible in the field of view 301. The notification 320 includes visual representations 322a-322c of the gauges 312a-312c, and each of the representations 322a-322c is accompanied by an indicator 324a-324c to represent the baseline sensor information 122 (e.g., predetermined positional threshold values for the needles 314a-314c).

The notification 320 includes a collection of determination indicators 326a-326c. The determination indicators 326a-326c provide a visual summary of the comparison between sensed information and baseline sensor information. In the illustrated example, the needle 314a indicates a value that is below a maximum threshold value indicated by the indicator 324a, and since the maximum threshold has not been exceeded, the determination indicator 326a displays a value of "OK". The needle 314b indicates a value that is above a maximum threshold value indicated by the indicator 324b, and since the maximum threshold has been exceeded, the determination indicator 326b displays a value of "Fault". The needle 314c indicates a value that is near a maximum threshold value indicated by the indicator 324c, and since the maximum threshold is at risk of being exceeded, the determination indicator 326c displays a value of "Caution". In some implementations the determination indicators 326a-326c can include other forms of indicator. For example, the representations 322a-322c can be color coded with green, red, and yellow highlights to further convey the determinations of "OK", "Fault", and "Caution" provided by the determination indicators 326a-326c.

Figure 4:
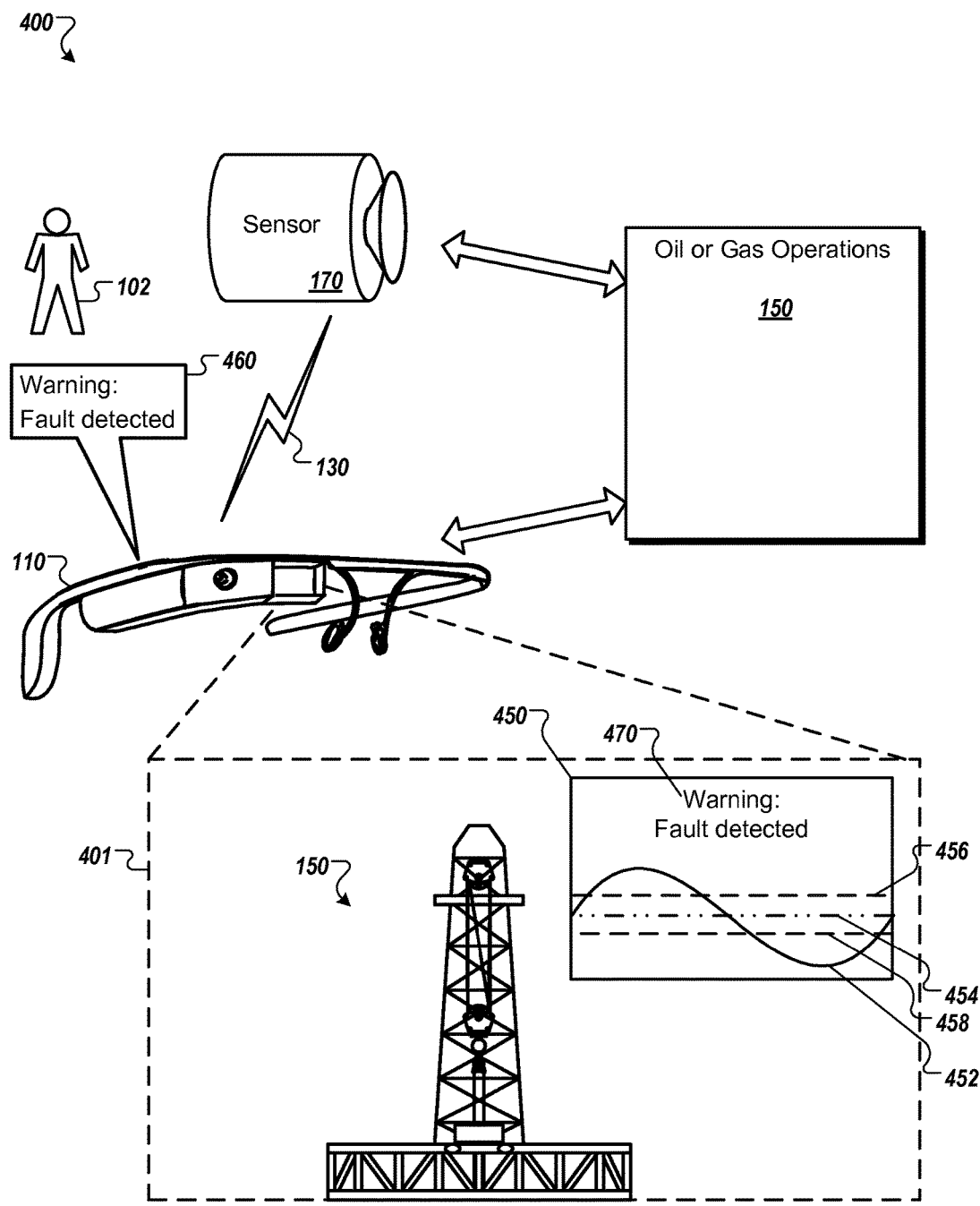

FIG. 4 shows a conceptual example 400 of an application of the wearable computer device 110 of FIG. 1 in an example of the gas and oil environment 150. In the illustrated example, sensors onboard the wearable computer device 110 (e.g., the sensors 118) and/or the external sensor 170 are configured to sense the oil or gas environment 150. Signals from the external sensor 170 are provided to the wearable computer device 110 either wired or wirelessly through the link 130.

For example, the external sensor 170 can be a vibration transducer. The transducer can be placed in contact with a pump, motor, or other mechanism that is part of the gas and oil environment 150, and be configured to provide a signal that represents the vibration of the mechanism. The signal can be provided to the wearable computer device 110 across the link 130.

The wearable computer device 110 receives the sensor signals and compares them to a collection of baseline sensor signal information (e.g., the baseline sensor information 122 of FIG. 1). Within a field of view 401, the wearable computer device 110 presents a notification in the form of a visual display 450 and an audible alert 460, e.g., "warning: fault detected". The visual display 450 includes a visual representation 452 of the received sensor information (e.g., the received sensor information 126 of FIG. 1), and a visual representation of the baseline sensor information in the form of a nominal value 454, an upper threshold 456, and a lower threshold 458. Visual display 450 also presents a textual notification 470, e.g., "warning: fault detected".

Figure 5:
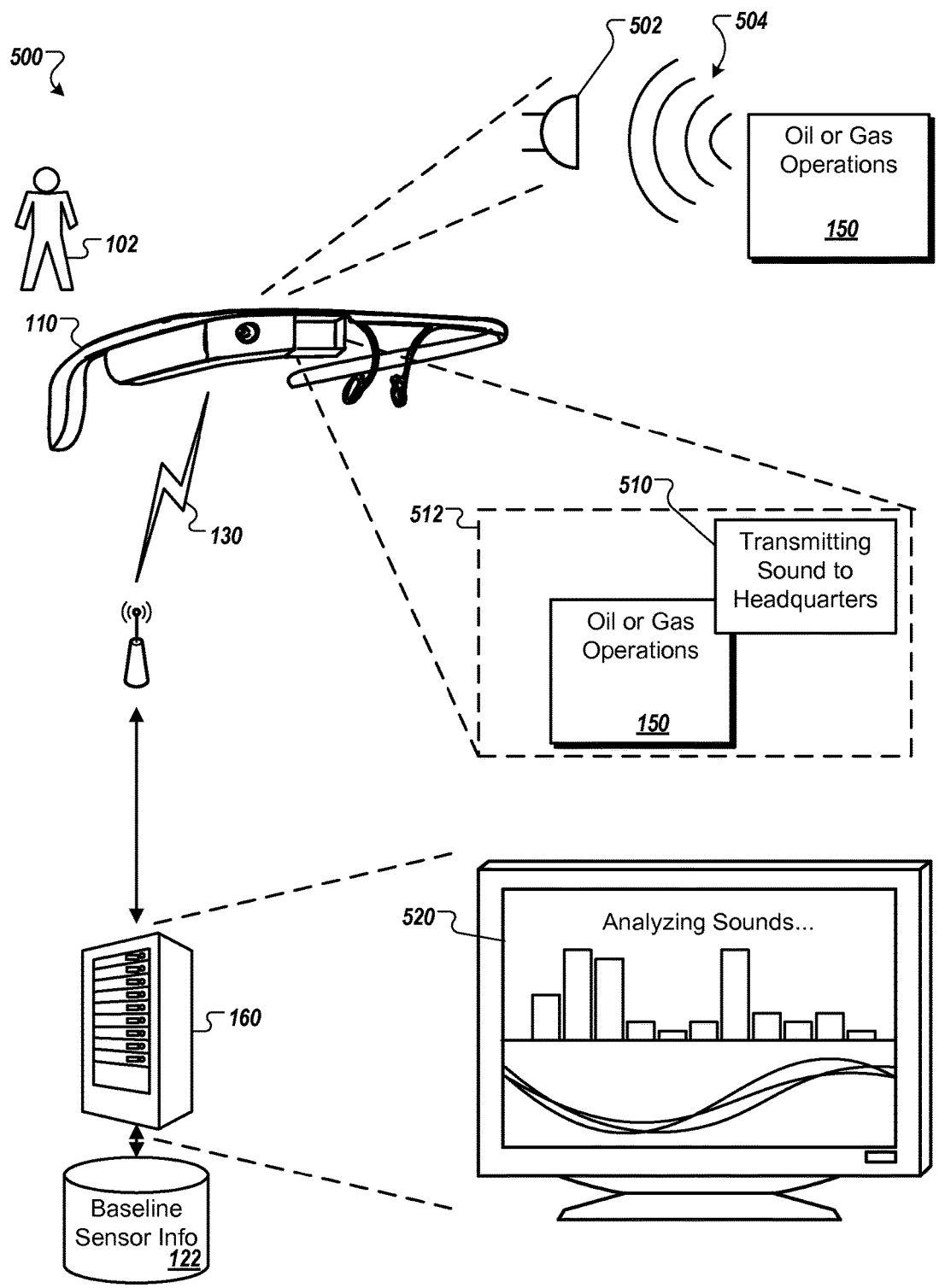

FIG. 5 shows a conceptual example 500 of an application of the wearable computer device 110 of FIG. 1 in an example of the gas and oil environment 150. In the illustrated example, a microphone 502 onboard the wearable computer device 110 (e.g., as one of the sensors 118) and/or the external sensor 170 is configured to receive sounds 504 produced by the oil or gas environment 150 (e.g., as the received sensor information 126 of FIG. 1). In some embodiments, the microphone 502 may include a parabolic structure or other means to focus upon a narrow field of sound emissions. In some embodiments, the microphone 502 may be worn in a manner (e.g. on head gear) so that as the wearer directs his gaze toward a portion of a machine or device, the microphone 502 can be oriented to pick up sounds emanating from that the observed portion of machine or device. In some embodiments, the microphone 502 may be an array of microphones arranged to directionally focus upon sounds emanating from a narrow field. In some implementations, noise cancellation technology may be used, For example, array elements or other sensors may be used to distinguish the sounds emanating from the location of interest from background noise.

Information based on the signals from the microphone 502 is provided through the link 130 to the server computer 160, or any other appropriate computer, terminal, or portable device configured to communicate with the wearable computer device 110 and/or the server 160.

In some implementations, the sounds 504 may be digitized and sent in an uncompressed form. In some implementations, the sounds 504 may be digitized and sent in a compressed form (e.g., lossless MP3). In some implementations, the sounds 504 may be pre-processed by the wearable computer device 110. For example, the wearable computer device 110 can the process the sounds 504 to determine a Fourier transform, and send the processed information to the server computer 160. The wearable computer device 110 provides a notification 520 within a field of view 512 to notify the user that sensor information about the sounds is being transmitted to a remote destination (e.g., "headquarters") for processing and/or analysis.

The sounds 504, in a compressed, uncompressed, processed, or unprocessed form, are received by the server computer 160. The server computer 160 processes the sounds 504 to identify characteristics of the sounds 504 that describe the oil or gas environment 150. For example, the server computer 160 can perform a spectral analysis on the sounds 504, determine a level of distortion, or perform any other appropriate analysis of the sounds 504. In some implementations, the server computer 160 can compare the sounds 504 or information determined from the sounds 504 to the baseline sensor info 122. For example, the server computer 160 can perform a fast Fourier transform (FFT) on the sounds 504, and compare the determined FFT to baseline FFT information stored at the baseline sensor information 122. The baseline FFT information may include expected nominal and/or threshold limits that can be used to analyze the performance of the gas or oil environment 150. For example, a drill bearing within the oil or gas environment 150 may emit high-frequency sounds when the bearing has failed or is in the process of failing, and these high frequency sounds may be identified by the server computer 160 as an indication that the bearing is in need of maintenance.

The server computer 160 provides a notification 520 to a user. In the illustrated example, the notification 520 is in the form of a visual display that presents textual and/or graphical information. In sonic embodiments, the notification can he in the form of an audible alarm, a text message (e.g., SIMS message), an email, a process management system alert, or any other appropriate form of information that can be used to alert a user of the notification. In some embodiments, the notification 520 can be provided by the wearable computer device 110. For example, the, server computer 160 can transmit the notification 520 to the wearable computer device 110 over the link 130, and the wearable computer device 110 can display or otherwise notify the user 102 of the notification 520.

Figure 6:
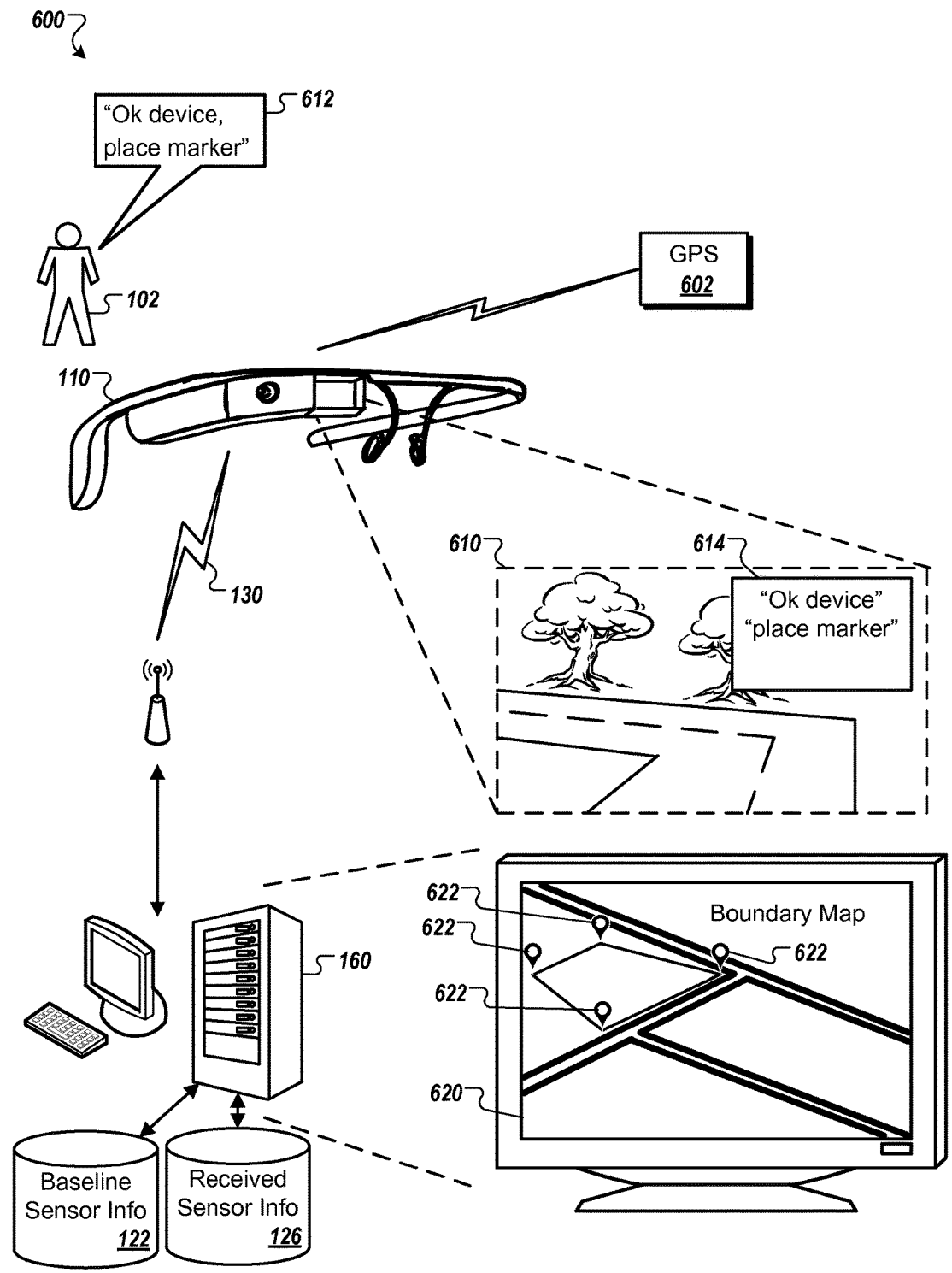

FIG. 6 shows a conceptual example 600 of an application of the wearable computer device 110 of FIG. 1 in an example of the gas and oil environment 150. In the illustrated example, the user 102 wears the wearable computer device 110 while surveying a potential drilling or facility site, and uses the wearable computer device 110 to identify and record locations within the site. A global positioning system receiver 602, configured as one of the sensors 118 and/or 170, provides location information as the user 102 tours the site.

The user 102 travels to a location within the site, as depicted by a field of view 610. The user 102 adds the location (e.g., a virtual location marker) to a database of locations (e.g., the baseline sensor information 122) by interacting with the wearable computer device 110, for example, by speaking a voice command 612 (e.g., "ok device, place marker"). The wearable computer device 110 responds by presenting a notification 614 within the field of view 610 to confirm the voice command 612, and by transmitting the location of the user 102, as provided by the GPS receiver 602, to the server 160 over the link 130.

The server 160 stores the location(s) as the received sensor information 126. The server 160 accesses a map database configured as the baseline sensor information 122 and the received sensor information 126 to provide a boundary map 620 in which the received locations are presented as a collection of location markers 622 overlaid upon a visual representation of information in the map database, as a comparison of the sensed locations against previously identified map locations. In some embodiments, the boundary map 620 and the collection of location markers 622 can provide a comparison of the received sensor information 126 and the baseline sensor information 122 as a notification. The server 160 can provide the notification at a terminal of the server, as the notification 614 within the field of view 610, or as any other appropriate form of notification.

Figure 7:
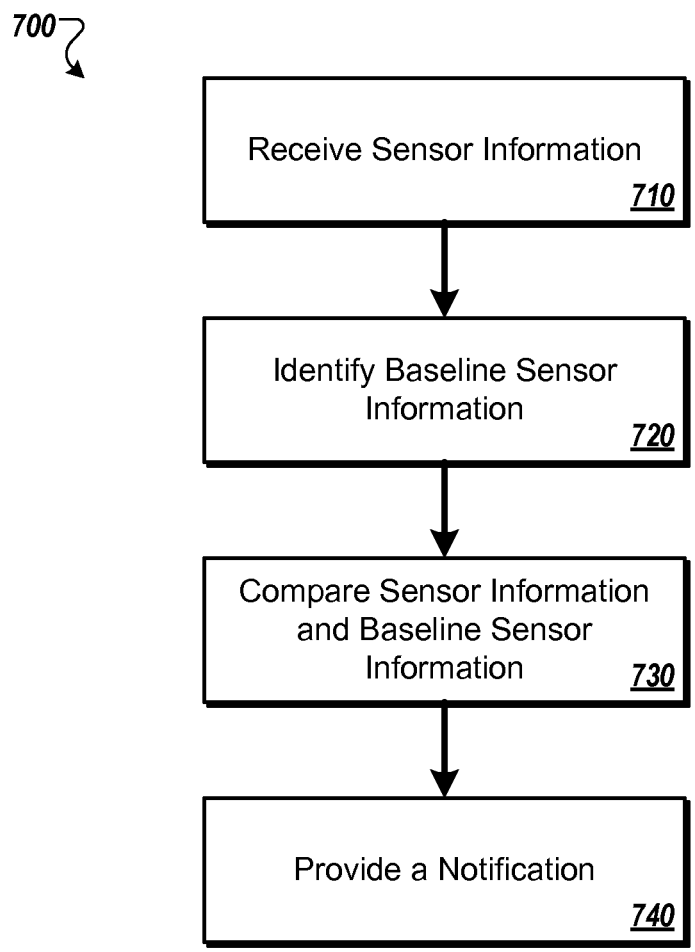
FIG. 7 is a flow diagram of an example process for using the wearable computer device of FIG. 1 in gas and oil drilling or production operations.

FIG. 7 is a flow diagram of an example process 700 for using the wearable computer device of FIG. 1 in gas and oil drilling or production operations. In some implementations, the process 700 can be used to perform some or all of the functions of the system 100.

At 710, sensor information is received, by a wearable computer device positionable on a human body, from a plurality of sensors that include a first sensor and a second sensor. The first sensor is attached to the human wearable device, and the second sensor is connected to the human wearable device. The sensor information describes operational attributes of an oil and gas drilling or production operation that either implements a hydrocarbon recovery process or a hydrocarbon recovery machine at a time of obtaining the sensor information. For example, the wearable computer device 110 can receive sensor information about the gas and oil environment 150 from the sensors 118 and the external sensor 170. In some implementations, the received sensor information can be stored by the wearable computer device 110 (e.g., as the received sensor information 126). In some implementations, the received sensor information can be provided to a remote location, such as over the link 130 to the server computer 160.

At 720, baseline sensor information describing operational attributes during normal operation or an earlier operation of either the hydrocarbon recovery process or the hydrocarbon recovery machine is identified. For example, the baseline sensor information 122 can be identified or accessed.

At 730, the sensor information is compared to the baseline sensor information. For example, the received sensor information, as represented by the visual representation 452 of FIG. 4 can be compared to the nominal value 454, the upper threshold 456, and the lower threshold 458. In some implementations, the comparing can be performed by the wearable computer device 110. In some implementations, the comparing can be performed by the server computer 160. In some implementations, the baseline sensor information can be stored by the wearable computer device 110 (e.g., as the baseline sensor information 122). In some implementations, the baseline sensor information can be received from a remote location, such as over the link 130 from the server computer 160.

At 740 the human-wearable device provides a notification indicating operational condition of the oil and gas drilling or production operations based on the comparing. For example, the wearable computer device 110 can provide the notification 320 of FIG. 3. In some implementations, the notification can be provided to a receiving device other than the wearable computer device 110. For example, the wearable computer device 110 or the server computer 160 can compare received sensor information to baseline sensor information, and provide the notification 520 of FIG. 5. In some implementations, the notification can indicate an operational condition of the oil and gas drilling or productions operations. For example, the notification 320 of FIG. 3 provides textual and graphical indications of the operational conditions represented by the gauges 312a-312c.

Figure 8:
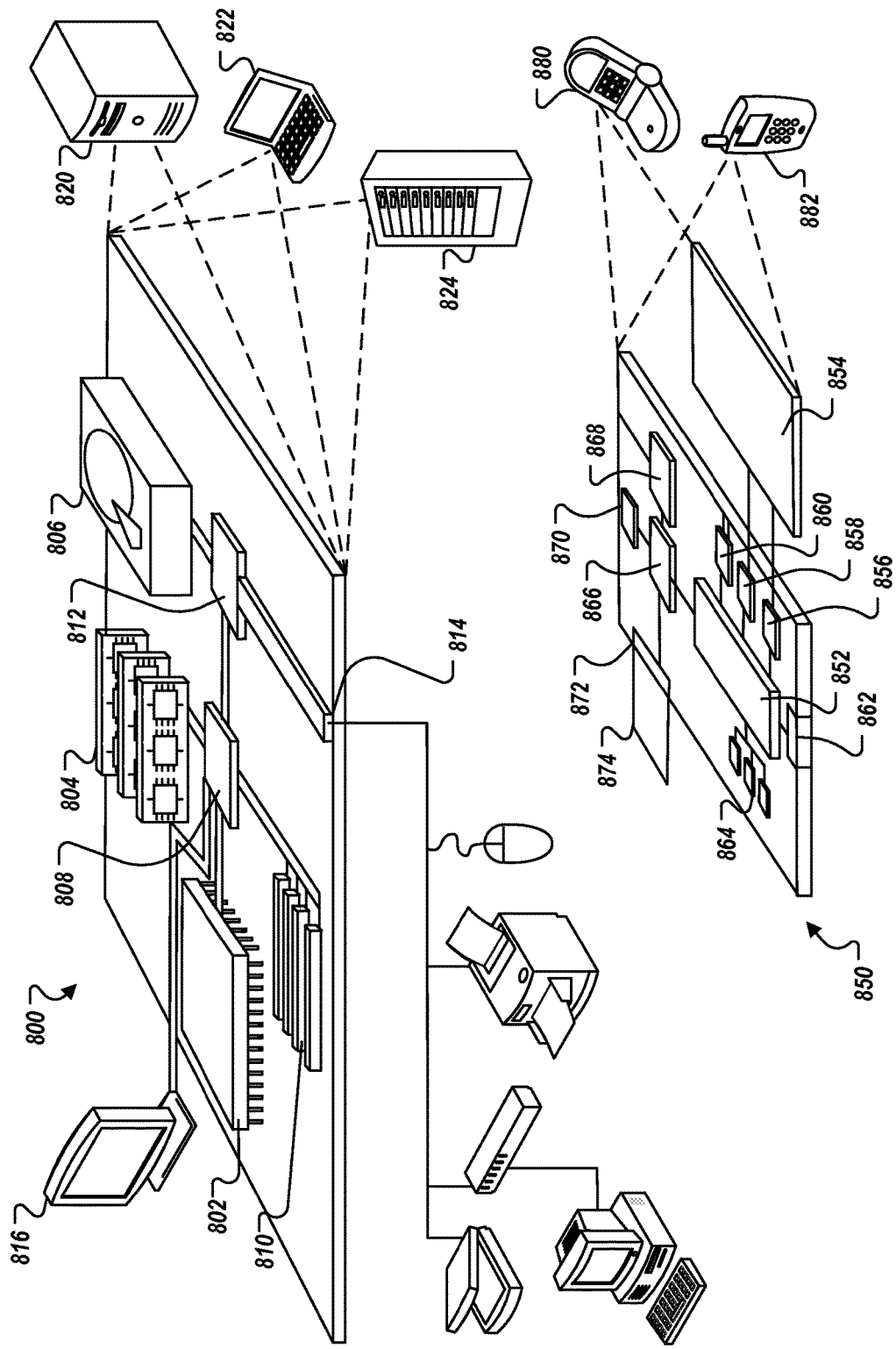
FIG. 8 is a block diagram of computing devices that may be used to implement the systems and methods described in this document.

FIG. 8 is a block diagram of computing devices 800, 850 that may be used to implement the systems and methods described in this document, either as a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as wearable computer devices, personal digital assistants, cellular telephones, smartphones, and other similar computing devices. In some embodiments, the computing device 800 and the computing device 850 can both represent various forms of mobile devices. The components shown here, their connections and relationships, and their functions, are meant to be exemplary only, and are not meant to limit implementations of the specification described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Device 850 may communicate wirelessly through communication interface 866, which may include digital signal processing circuitry where necessary. Communication interface 866 may provide for communications under various modes or protocols, such as GSM voice calls, Voice Over LTE (VOLTE) calls, SMS, EMS, or MMS messaging, CDMA, TDMA, PDC, WCDMA, CDMA2000, GPRS, WiMAX, LTE, among others. Such communication may occur, for example, through radio-frequency transceiver 868. In addition, short-range communication may occur, such as using a Bluetooth, WiFi, or other such transceiver (not shown). In addition, GPS receiver module 870 may provide additional wireless data to device 850, which may be used as appropriate by applications running on device 850.

Device 850 may also communication audibly using audio codec 860, which may receive spoken information from a user and convert it to usable digital information. Audio codex 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In certain embodiments, methods and processes as described above in the context of a hydrocarbon production facility may be applied in an analogous environment, for example, in relation to a hydrocarbon refinery, processing facility, chemical or pharmaceutical production plant, mining operation, food processing facility, pulp and paper processing plant, manufacturing assembly line, and other facilities inclusive of machines and devices whose condition needs monitoring.

A number of embodiments of the specification have been described. Nevertheless, it will be understood that various modifications may be made without departing from the spirit and scope of the disclosure. For example, various forms of the flows shown above may be used, with steps re-ordered, added, or removed. Accordingly, other embodiments are within the scope of the following claims.

What is claimed is:

1. A system for monitoring oil and gas drilling or production operations, comprising:
    a wearable computer device postionable on a human body, said wearable computer device including a processor, and a controller, said controller being configured to:
        receive sensor information from a plurality of sensors that includes a first sensor and a second sensor, the first sensor attached to the human wearable device and the second sensor being an image sensor connected to the human wearable device, the sensor information describing operational attributes of the oil and gas drilling or production operations, wherein the operational attributes are of an oil and gas drilling or production operation selected from the group consisting of surveying, drilling, tripping pipe, mixing fluids, pumping fluids, running wireline logging tools or slickline tools, running casing, pumping cement, perforating, pressure pumping including for fracturing, production of produced fluids, managing of produced fluids, running coiled tubing, running intervention tools, and plugging;
        identify baseline sensor information based on received image sensor data and describing the operational attributes during an earlier operation of processes and machines used in the oil and gas drilling or production operation, wherein:
            the baseline sensor information describes an anticipated characteristic of a sensed output under a given set of input conditions; and
            the machines include rotary elements and/or reciprocating elements;
        compare the sensor information and the baseline sensor information; and
        provide a notification indicating an operational condition of the oil and gas drilling or production operation based on the comparison of the sensor and baseline sensor information.

2. The system of claim 1, wherein the second sensor is external to and readable by the wearable computer device, the second sensor being configured to collect information about the oil or gas drilling or production operation and at least one of the machines used in the oil and gas drilling or production operation.

3. The system of claim 1, further comprising a server computer device in communication with the wearable computer device and configured to:
    receive, from the wearable computer device, a request for the baseline sensor information; and,
    provide, to the wearable computer device, one or more of the baseline sensor information and the notification.

4. The system of claim 1, further comprising a server computer device in communication with the wearable computer device and configured to:
    receive, from the wearable computer device, the sensor information;
    identify baseline sensor information describing operational attributes of the oil and gas drilling or production operations during the earlier operation of either the processes or the machines used in the oil and gas drilling or production operation;
    identify comparison information comparing the sensor information and the baseline sensor information; and
    provide the comparison information to the wearable computer device.

5. The system of claim 4, wherein the server computer device is configured to provide the notification indicating operational condition of the oil and gas drilling or production operations.

6. The system of claim 1, wherein the wearable computer device further comprises a head-mounted display (HMD), wherein the HMD is configured to provide a field of view in which at least a portion of an environment of the wearable computing device is viewable, and wherein the HMD is operable to display images superimposed over the field of view.

7. The system of claim 1, wherein the second sensor comprises a thermal imaging sensor.

8. The system of claim 1, wherein the second sensor comprises an auditory sensor.

9. The system of claim 1, wherein the anticipated characteristic is from a previous observed condition, a calculation, or manufacturer specified condition.

10. The system of claim 1, wherein the rotary elements and/or reciprocating elements are selected from the group consisting of top drive systems, pumps, compressors, mixers, material handling machines, cable spools, blocks, drill strings, generators, coiled tubes, and coiled tubing injector machines.

11. A non-transitory computer-readable medium storing instructions that, when executed by data processing apparatus of a wearable computer device positionable on a human body and including a processor, perform operations for monitoring oil and gas drilling or productions operations, the operations comprising:
    receiving sensor information from a plurality of sensors that includes a first sensor and a second sensor, the first sensor attached to the human wearable device and the second sensor being an image sensor connected to the human wearable device, the sensor information describing operational attributes of the oil and gas drilling or production operations, wherein the operational attributes are of an oil and gas drilling or production operation selected from the group consisting of surveying, drilling, tripping pipe, mixing fluids, pumping fluids, running wireline logging tools or slickline tools, running casing, pumping cement, perforating, pressure pumping including for fracturing, production of produced fluids, managing of produced fluids, running coiled tubing, running intervention tools, and plugging;
    identifying baseline sensor information based on received image sensor data and describing the operational attributes of the during normal operation of either processes and machines used in the oil and gas drilling or production operations, wherein:
        baseline sensor information describes an anticipated characteristic of a sensed output under a given set of input conditions; and
        machines include rotary elements and/or reciprocating elements;
    comparing the sensor information and the baseline sensor information; and
    providing a notification indicating an operational condition of the oil and gas drilling or production operation based on the comparison of the sensor and baseline sensor information.

12. The medium of claim 11, wherein the second sensor is external to and readable by the wearable computer device, the second sensor being configured to collect information about the oil or gas drilling or production operation environment and at least one of the machines used in the oil and gas drilling or production operation.

13. The medium of claim 11, wherein the second sensor comprises an auditory sensor.

14. The medium of claim 11, wherein the second sensor comprises a thermal imaging sensor.

15. The medium of claim 11, further comprising a server computer device, wherein the server is in communication with the wearable computer device.

16. The medium of claim 15, wherein the server computer device is configured to:
    receive, from the wearable computer device, a request for the baseline sensor information; and,
    provide, to the wearable computer device, one or more of the baseline sensor information and the notification.

17. The medium of claim 15, wherein the server computer device is configured to:
    receive, from the wearable computer device, the sensor information;
    identify baseline sensor information describing the operational attributes of the oil and gas drilling or productions operations during normal operation of either the processes or the machines used in the oil and gas drilling or production operation;
    identify comparison information comparing the sensor information and the baseline sensor information; and
    provide the comparison information to the wearable computer device.

18. A method for monitoring oil and gas drilling or production operations, comprising:
    receiving, by a wearable computer device positionable on a human body, sensor information from a plurality of sensors that include a first sensor and a second sensor, the first sensor attached to the human wearable device and the second sensor being an image sensor connected to the human wearable device, the sensor information describing operational attributes of the an oil and gas drilling or production operations, wherein the operational attributes are of an oil and gas drilling or production operation selected from the group consisting of surveying, drilling, tripping pipe, mixing fluids, pumping fluids, running wireline logging tools or slickline tools, running casing, pumping cement, perforating, pressure pumping including for fracturing, production of produced fluids, managing of produced fluids, running coiled tubing, running intervention tools, and plugging;
    identifying baseline sensor information based on received image sensor data and describing the operational attributes during normal operation of processes and machines used in the oil and gas drilling operations, wherein:
        the baseline sensor information describes an anticipated characteristic of a sensed output under a given set of input conditions; and
        the machines include rotary elements and/or reciprocating element;
    comparing the sensor information and the baseline sensor information; and
    providing, by the human-wearable device and based on the comparing, a notification indicating operational condition of the oil and gas drilling or production operations based on the comparison of the sensor and baseline sensor information.

19. The method of claim 18, further comprising a server computer device in communication with the wearable computer device and configured to:
    receive, from the wearable computer device, a request for the baseline sensor information; and,
    provide, to the wearable computer device, one or more of the baseline sensor information and the notification.

20. The method of claim 18, further comprising a server computer device in communication with the wearable computer device and configured to:
    receive, from the wearable computer device, the sensor information;
    identify baseline sensor information describing the operational attributes of the oil and gas drilling or production operations during normal operation of either the processes or the machines used in the oil and gas drilling or production operation;

identify comparison information comparing the sensor information and the baseline sensor information; and provide the comparison information to the wearable computer device.

21. The method of claim 20, wherein the server computer device is configured to provide the notification indicating operational condition of the oil and gas drilling or production operations.

22. The method of claim 20, wherein the notification is provided to a receiving device other than the wearable computer device.

23. The method of claim 18, wherein the second sensor comprises a thermal imaging sensor.

24. The method of claim 18, wherein the second sensor comprises an auditory sensor.

25. The method of claim 18, wherein the wearable computer device comprises:

a processor;

one or more first sensors that are integral to the wearable computer device; and a head-mounted display (HMD), wherein the HMD is configured to provide a field of view in which at least a portion of an environment of the wearable computing device is viewable, and wherein the HMD is operable to display images superimposed over the field of view.

26. The method of claim 18, wherein the second sensor is external to and readable by the wearable computer device, the second sensor being configured to collect information about the oil and gas drilling or production operations and at least one of the machines-used in the oil and gas drilling or production.

* * * * *

UNITED STATES PATENT AND TRADEMARK OFFICE
CERTIFICATE OF CORRECTION

PATENT NO. : 10,378,318 B2
APPLICATION NO. : 15/309720
DATED : August 13, 2019
INVENTOR(S) : Daniel David Gleitman et al.

Page 1 of 1

It is certified that error appears in the above-identified patent and that said Letters Patent is hereby corrected as shown below:

In the Specification

In Column 10, Line 32, after --In-- delete "sonic" and insert --some--

In Column 10, Line 33, delete "he" and insert --be--

In Column 10, Line 34, delete "SIMS" and insert --SMS--

In Column 10, Line 38, after --For example,-- delete "the," and insert --the--

In the Claims

In Claim 11, Column 17, Line 35, after --operation of-- delete "either"

Signed and Sealed this
Twenty-second Day of October, 2019

Andrei Iancu
*Director of the United States Patent and Trademark Office*